June 30, 1970   F. R. TULLY ET AL   3,517,968
WHEEL RIM TRIM RING
Filed Oct. 9, 1968

INVENTORS
FRANK R. TULLY
WARREN L. MEYER
BY
Barnes, Kisselle, Raisch & Choate
ATTORNEYS

United States Patent Office 3,517,968
Patented June 30, 1970

3,517,968
WHEEL RIM TRIM RING
Frank R. Tully and Warren L. Meyer, Ingham County, Mich., assignors to Motor Wheel Corporation, Lansing, Mich., a corporation of Ohio
Filed Oct. 9, 1968, Ser. No. 766,191
Int. Cl. B60b 7/00
U.S. Cl. 301—37           9 Claims

ABSTRACT OF THE DISCLOSURE

A decorative trim ring comprising an annular continuous strip of stainless steel adapted to be attached to the outboard face of the rim of an automotive passenger vehicle wheel. The inner edge of the trim ring has an external circumferentially extending groove which carries a bead of resilient material, preferably in the form of a rubber O-ring, which has a squeeze fit between the inboard edge of the trim ring and the inner surface of the wheel well. The outboard edge of the trim ring is both mechanically captured by a reentrant radius on the outboard bead flange of the wheel and is adherently secured thereto by another continuous ring of resilient material, preferably in the form of an adhesive. The trim ring provides a decorative cover over the outboard face of the wheel rim, and the space between the trim ring and rim face are sealed by the aforementioned connections between the trim ring and rim face.

---

An object of the present invention is to provide a decorative trim ring adapted to be easily and permanently applied to the outboard face of the rim of an automotive passenger vehicle wheel which is sealed against entry of moisture, dirt or other foreign matter into the space between the trim ring and wheel rim face, and which is held to the rim in such a manner that rattling and rotation of the trim ring relative to the wheel is prevented.

Another object is to provide a trim ring of the above character which is economical in construction and in assembly to the wheel rim.

Further objects as well as advantages and features of the present invention will become apparent from the following detailed description taken in conjunction with the accompanying drawing in which.

Figure 1:
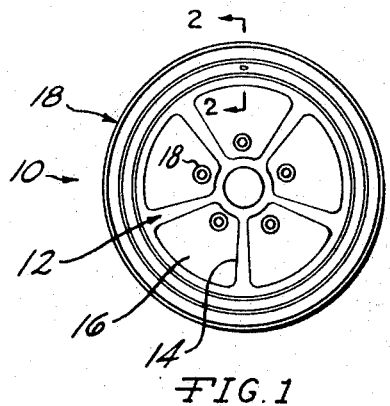
FIG. 1 is a side elevational view of an automotive vehicle passenger wheel having a trim ring of the invention mounted thereon.

Referring in more detail to the accompanying drawings, FIG. 1 illustrates a conventional automotive passenger vehicle wheel 10 of the type adapted to receive a pneumatic tire thereon. Wheel 10 has a stamped steel or cast non-ferrous wheel disc or body 12 provided with radial spokes 14, indented portions 16 between the spokes and a mounting circle containing the usual bolt holes 18 for mounting the wheel on the wheel hub in the conventional manner. Wheel body 12 is secured by an arc weld 14 (FIG. 2) to the well portion 16 of a conventional drop center rolled steel rim 18.

With a wheel body 12 of the character shown, the ornamentation of the body itself on its outboard side is "built-in" to the wheel and therefore a separate ornamental wheel cover is neither necessary nor desirable to hide and decorate this portion of the wheel. However the outboard face 20 of wheel rim 18 is enhanced in appearance by the application of a trim ring 22 of the present invention since the same is made of non-corrosive material, such as stainless steel, and given a high polish.

Figure 2:
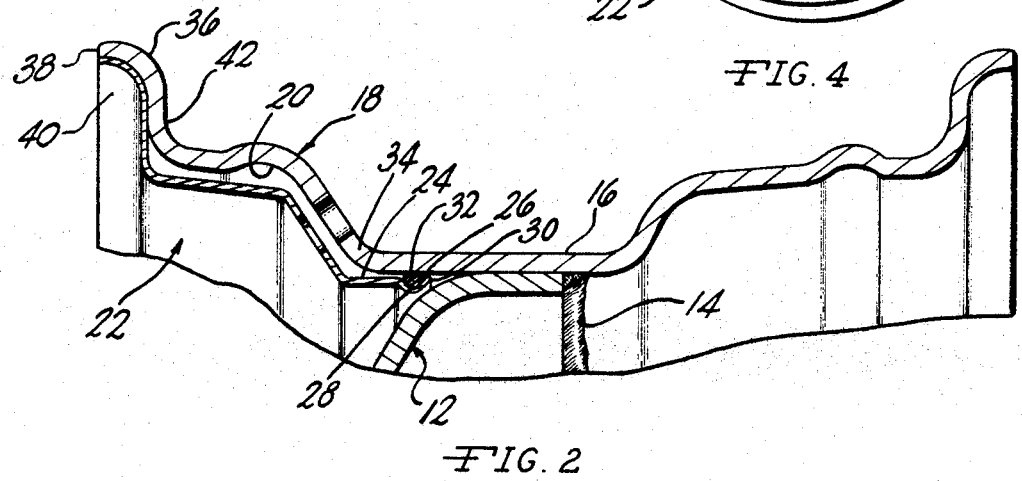
FIG. 2 is a vertical section taken on the line 2—2 of FIG. 1, but on a greatly enlarged scale.

Trim ring 22 consists of an annular continuous strip of stainless steel rolled or stamped from a flat blank to a contour generally complemental to the exterior surface 20 of the outboard side of rim 18. As best seen in FIG. 2, rim 22 has an axially extending portion 24 adjacent its inboard edge in which is formed a continuous, circumferentially extending external groove 26 defined by a rib 28. Rib 28 terminates at the inboard edge of ring 22 in a circumferential lip 30 having an outside diameter at the terminal edge slightly greater than that of portion 24, but slightly less than the inside diameter of the wheel well 16. A continuous (non-split) synthetic rubber ring 32, resembling an out-size O-ring, is adapted to seat in groove 26 as shown in FIG. 2. Ring 32 in its relaxed or free state condition has an inside diameter slightly less than the root diameter of groove 26 so that ring 32 is stretched and maintained under tension when seated in groove 26. Ring 32 is flexible and resilient and hence may be readily stretched to insert it from the inboard side of ring 22 into the groove, as by rolling ring 32 over lip 30, whereupon it will snap by its own resilient tension into the groove. The outside diameter of ring 32 is slightly greater than the inside diameter of well 16.

To assemble trim ring 22 onto wheel 10, ring 22 with rubber ring 32 assembled thereon as described above is brought axially into juxtaposition with the outboard face of wheel rim 18, ring 22 being disposed in coaxial alignment with the wheel. Ring 22 is then moved axially or endwise, narrow end first into the position shown in FIG. 2. When ring 32 has been so moved axially of the wheel (to the right as viewed in FIG. 2) to the point where ring 32 engages the outboard corner 34 of well 16, ring 32 will engage the inner surface of the rim but will resiliently yield and deform as ring 32 slides against the inner surface of the wheel well to permit the further final insertion of ring 22 to the position shown in FIG. 2. Thus when ring 22 has been inserted to final assembled position on the wheel rim, ring 32 will have been squeezed to provide a frictional engagement between the trim ring and rim well to thereby securely retain the trim ring on the rim, the frictional engagement also preventing rotation of ring 22 relative to the rim and rattling of the ring against the rim. Ring 32 also provides a water-proof seal along the inboard edge of the trim ring.

Ring 22 is preferably also mechanically retained in place on rim 18 by a "snap-in" engagement with the outboard bead flange 36 of rim 18. Flange 36 at its outer edge 38 is turned very slightly inwardly toward the axis of the wheel so that the outboard, outwardly flared edge 40 of ring 22 is slightly squeezed as it is pushed past edge 38 during the last increment of the endwise insertion of ring 22 onto rim 18. Flange 40 of ring 22 is preferably shaped to fit closely against the outer surface of flange 36 from its terminal edge 38 approximately down to the corner 42 of the outboard bead seat of the wheel rim. This close fit plus the slight compression of flange 40 by flange 38 insures a dirt-proof mechanical seal between the outboard edge of the trim ring and wheel rim.

When thus secured on rim 18, trim ring 22 is securely held against dislodgement from the wheel, and sand, stone or other debris cannot enter the space between ring 22 and rim 18 to produce annoying noise when the wheel rotates. With the water-proof seal along the inboard edge of the trim ring, any water thrown outwardly by centrifugal force from along the surface of body 12 toward well 16 of the rim during wheel rotation cannot enter past ring 32. This seal, plus the anti-corrosion property of the stainless steel material of the trim ring, helps prevent rust and unsightly discoloration of the wheel in use. The mechanical seal provided between flange 40 and flange 38 under normal conditions is sufficient to prevent entry of moisture because the seapage to this joint must work against centrifugal force when the wheel is rotating. However should such moisture enter the space between the trim ring and rim, the same will tend to be thrown out by centrifugal force through the same joint by which it entered this space when the wheel rotates.

Figure 3:
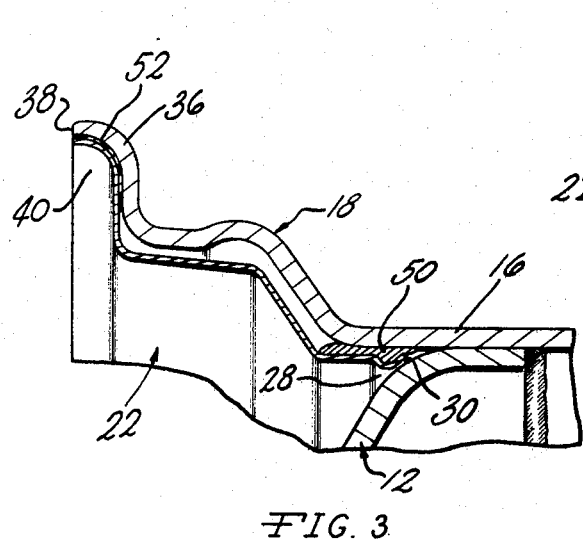
FIG. 3 is a fragmentary sectional view similar to that of FIG. 2 but illustrating a modified form of the invention.

As an alternative to rubber ring 32 at the inboard edge of the trim ring 22, the external groove 26 of ring 22 may be filled with a heavy bead 50 (FIG. 3) of a resilient adhesive material, preferably a room temperature vulcanizing compound having good sealing qualities and resiliency after curing, such as that known as "RTV Silastic 892" manufactured by Dow Corning. When using a seal of this nature it is preferred to insert trim ring 22 onto rim 18 before bead 50 has set up so that the same will bond to both the exterior surface of the trim ring as well as the interior surface of well 16. However, if desired, bead 50 may be allowed to set and cure prior to assembly of the trim ring onto the wheel, in which case it will be resiliently deformed in the manner of rubber ring 32 to provide a compression-friction type seal with the wheel rim along the inboard edge of the trim ring.

In a similar manner, another bead 52 of the aforementioned adhesive sealing material may be applied either to the inboard surface of ring flange 40 or to the outboard surface of rim flange 36, or to both. Ring 22 is then assembled against the wheel rim prior to curing of this bead to provide an adhesively bonded and watertight joint between flanges 40 and 36. When ring 22 is mounted as described above and as shown in FIG. 3, the space between the ring 22 and rim 18 is hermetically sealed as well as being sealed against entry of liquid, in addition to being securely maintained on the wheel against dislodgement. Moreover, because of the resilient rubbery nature of beads 32 or 50 interposed between the rim and ring there is less tendency of the trim ring to produce noise and no relative movement between rubbing metal surfaces which tends to induce wear and rattling over extended periods of usage.

It is also to be understood that a bead 52 of adhesive may be used in conjunction with the trim ring-wheel rim assembly of FIG. 2 to augment the previously described mechanical "snap-in" retention along the outboard edge of the trim ring.

Figure 4:
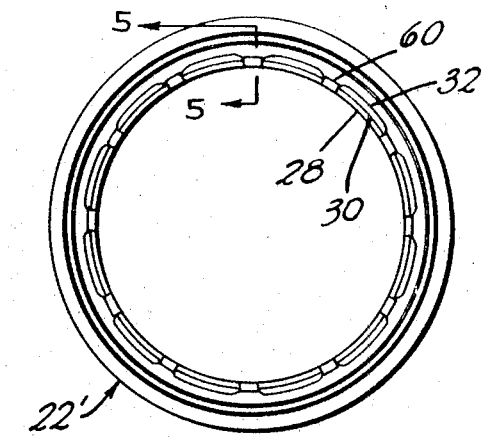
FIG. 4 is a side elevational view looking at the inboard side of a further modification of a trim ring in accordance with the present invention.
Figure 5:
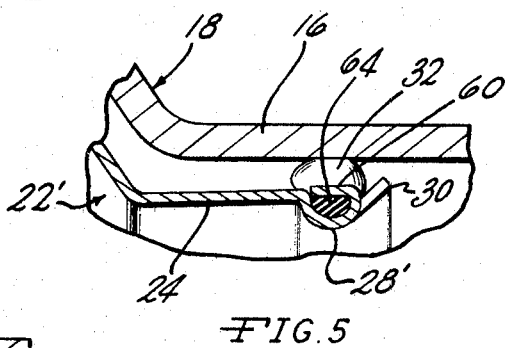
FIG. 5 is a fragmentary vertical section taken on the line 5—5 of FIG. 4.

Referring to FIGS. 4 and 5, a modified trim ring 22′ of the invention is illustrated, the same being viewed in FIG. 4 from the inboard side thereof and separate from the wheel, and being shown in assembled position in conjunction with a portion of the wheel rim 18 in FIG. 5. Trim ring 22′ is identical to ring 22 described previously except that lip 30 along the inboard edge of the trim ring is interrupted at angularly spaced points by a series of circumferentially spaced tabs 60 which are bent back as shown in FIG. 5 to overlie and crimp rubber ring 32 so that the same is compressed to a smaller cross section 64 as shown in FIG. 5. This crimped-on retention of ring 32 on ring 22′ is useful when ring 32 is made of a relatively soft spongy-type rubber material of low tensile strength which is less adapted to be self-retaining under tension in groove 26 of the trim ring. In other respects, the assembly of trim ring 22′ with wheel rim 18 is similar to that described previously.

Rings 22 and 22′ may be provided with the usual hole to allow insertion of the air valve stem through the trim ring, the usual rubber stem tightly fitting through the ring hole so that the hole is sealed by the air valve stem.

We claim:
1. In combination, a wheel having a tire-receiving rim and an ornamental trim ring mounted adjacent the outboard face of said rim, said rim having a drop center portion, an outboard side wall and a circumferentially extending tire bead retaining flange at the outboard edge thereof, said trim ring comprising an annular one piece non-split member having a cross sectional configuration adapted to generally mate with the outboard face of the wheel rim, said ring further having a circumferentially continuously extending external groove adjacent the inboard edge thereof, a circumferentially extending body of resilient material disposed in said groove and protruding radially outwardly therefrom beyond the outside diameter of said inboard edge of said ring, said body of material having an outside diameter greater than the inside diameter of the drop center portion of the wheel rim prior to assembly on the wheel rim, said body of resilient material securing said inboard edge of said ring to said drop center portion, and means securing an outboard portion of said ring to said rim flange.

2. The trim ring as set forth in claim 1 wherein said body of resilient material comprises a continuous rubber O-ring having an inside diameter less than the root diameter of said trim ring groove in the free state condition of said O-ring whereby said O-ring is stretched and maintained under tension when seated in said groove to thereby retain said O-ring in said groove.

3. The trim ring as set forth in claim 1 wherein said bead of material comprises a cointinuous circumferentially extending bead of resilient adhesive material.

4. The trim ring as set forth in claim 1 wherein said trim ring has an outboard flange shaped complemental to the outboard flange of the wheel rim, said rim flange having a reentrant outer edge, said ring flange being dimensioned to have an interference fit with said reentrant outer edge of said wheel rim flange during endwise insertion of said trim ring onto said wheel rim whereby said ring flange is held under compression by said wheel rim flange in the assembled position of the trim ring on the wheel rim.

5. In a wheel structure, a wheel including a tire rim having a tire bead retaining flange at its outboard edge, and a circular covering trim ring formed to be resiliently snapped into retained engagement with said bead flange of said rim to cover the outboard face of the rim, said trim ring having an outboard peripheral edge fitting close against the surface of said bead flange of said wheel rim and being secured thereto by a bead of resilient adhesive material, the inboard edge of said trim ring having a circumferentially extending external groove spaced radially inwardly from the drop center well of the wheel rim, and a bead of resilient material interposed in said groove between said rim and said well and being flexed to a distored condition by a press fit between said bead, said trim ring and the well of the wheel rim.

6. The combination set forth in claim 5 wherein said bead of material comprises a rubber O-ring having an inside diameter in its free state condition less than the root diameter of said trim ring groove whereby said O-ring is stretched and under tension so as to be self-retaining in said groove.

7. The combination set forth in claim 5 wherein the trim ring has an outboard flange shaped complementally to the outboard flange of said rim and disposed closely adjacent thereto, and wherein a second bead of resilient adhesive material is interposed between said outboard rim flange and said outboard flange of said trim ring adherently securing the same to said rim and forming a watertight circumferentially continuous joint between outboard flanges of said rim and ring.

8. The combination set forth in claim 7 wherein said trim ring is spaced from the outboard face of said wheel rim by said first and second beads of resilient material interposed between the inboard and outboard edges of said ring and the corresponding portions of said wheel rim.

9. The combination set forth in claim 5 wherein said trim ring has a plurality of circumferentially spaced tabs formed along the inboard edge of said trim ring bent down to overlie and clamp on said ring said bead of resilient material disposed in said trim ring groove.

References Cited

UNITED STATES PATENTS

| | | | |
|---|---|---|---|
| 1,985,378 | 12/1934 | Lyon | 301—37 |
| 2,274,496 | 2/1942 | Mulhern | 301—37 |
| 2,279,330 | 4/1942 | Lyon | 301—37 |
| 2,304,581 | 12/1942 | Lyon | 301—37 X |
| 2,368,249 | 1/1945 | Lyon | 301—37 |
| 2,903,300 | 9/1959 | Hurd | 301—37 |
| 2,963,324 | 12/1960 | Wood | 301—37 |
| 3,346,301 | 10/1967 | Hurst | 301—65 |

RICHARD J. JOHNSON, Primary Examiner

U.S. Cl. X.R.

29—159.3